Patented June 30, 1925.

1,544,534

UNITED STATES PATENT OFFICE.

CARLETON ELLIS AND NORRIS BOEHMER, OF MONTCLAIR, NEW JERSEY; SAID BOEHMER ASSIGNOR TO CHADELOID CHEMICAL COMPANY, OF NEW YORK, N. Y., A CORPORATION OF WEST VIRGINIA.

CHLORINATED RUBBER PRODUCT AND PROCESS OF MAKING SAME.

No Drawing. Application filed July 14, 1922. Serial No. 575,045.

*To all whom it may concern:*

Be it known that we, CARLETON ELLIS and NORRIS BOEHMER, citizens of the United States, and residents of Montclair, in the county of Essex and State of New Jersey, have invented certain new and useful Improvements in Chlorinated Rubber Products and Processes of Making Same, of which the following is a specification.

This invention relates to process of making chlorinated rubber and relates particularly to the treatment of rubber with chlorine under pressure and conditions favorable to the production of a uniformly chlorinated product.

Raw rubber is not highly soluble in organic solvents and solutions of rubber cannot be made of a sufficient concentration to permit of the production of chlorinated rubber in a cheap manner simply by passing chlorine gas through such solutions. Aside from the reaction which may take place with the solvent there is loss of the solvent itself in handling, the difficulty of removing the solvent from the end product and various other difficulties. Hence chlorinated rubber has proved a relatively costly product to manufacture.

In the present invention it is an object to do away with the solvent entirely or in any event to have no such proportion of solvent present as would accomplish more than a softening effect on the rubber. Preferably the rubber is treated in sheet form, ordinary crêpe rubber being suitable for the purpose. Rubber also may be used in shredded form or in any other suitable condition. It may be masticated on differential rolls or rubber mills to render it more plastic and permeable to the gas. Besides raw rubber, fabricated rubber articles, vulcanized rubber, inner tubes and the like also may be treated. The chlorination of raw rubber yields a product many times more soluble in benzol, carbon bisulphide, chlorbenzol, carbon tetrachloride, trichlorethylene and similar solvents than is the case with the unchlorinated material. The solubility in these solvents in general increases with the degree of chlorination so that with a high chlorine content for example 70 per cent or more a product is obtained which is as soluble in these solvents as many resins and may be used like the resins for varnishes and coating compounds of various types. Besides rubber, gutta percha and related substances may be used including balata and like material.

The chlorine employed is preferably dry but the process is not inhibited by the presence of moisture so that rubber containing a certain amount of moisture may be chlorinated without first drying. On the other hand thoroughly dried rubber may be used in some cases. The chlorine is preferably used pure but also may be employed in a diluted form containing nitrogen, carbon dioxide, air, oxygen, etc. The chlorine may also have added to it bromine or iodine, the latter acting to some extent as a catalyst. Or sulphur chloride may be introduced with the chlorine if a combined chlorinating and vulcanizing effect is desired. Vulcanized products are not nearly as soluble as those made from the raw rubber and generally speaking are not as desirable.

The rubber or other material which is to be chlorinated is exposed in a pressure vessel to a critical pressure which for ordinary crêpe rubber is about 60 pounds. At pressures below 60 pounds very little chlorination will take place even on exposure to chlorine for a long period. For example dry sheet rubber was exposed for a period of 90 hours to a pressure somewhat below 60 pounds with a gain of only about one-third in weight due to absorption of chlorine and in this experiment the action was found to be confined to the surface of the sheets the penetration of the chlorine being low. While therefore for low degrees of chlorination pressures under 4 atmospheres may be used ordinarily we prefer to use superatmospheric pressures above 4 or 5 atmospheres. The rubber is preferably exposed in thin sheets suitably separated one from another to permit of the free ingress of chlorine. During the chlorination swelling occurs the material becoming vesiculated and increasing in bulk to such an extent that allowance should be made in the chlorination vessel to that end. There should be plenty of free space in the chamber to permit of the expansion as the latter brings about a considerable degree of coalescence of the adjacent pieces resulting in a rigid mass of considerable thickness and difficultly permeable to chlorine unless allowance is made for expansion as aforesaid.

Probably the first action of chlorine on contacting with the rubber is to form the chlorinated rubber by addition, substitution also taking place quickly. It also appears to be a general rule that the coalescence occurs during the latter stages of chlorination more particularly during the substitution stage during which period there is a considerable evolution of heat. It is necessary to guard against overheating and the production of a black more or less carbonized product. For example in one case sheets of rubber which were rather closely massed and too rapidly chlorinated to allow of adequate radiation of heat from the apparatus, yielded a rigid mass of coalesced sheets of the chlorinated product which was very much discolored in the center.

In using liquid chlorine it is desirable to warm the chlorine containers slightly in order to raise the pressure to at least 100 pounds, preferably 125 pounds, in order to maintain effective working and uniform pressure on the mass of rubber. The treating vessel may be equipped with a cooling coil or jacket which also may be used for warming the apparatus in cold weather in order to facilitate the start of the reaction and to make undue pressures unnecessary. Thus the treating chamber is preferably held slightly above ordinary room temperature but is kept below that temperature at which carbonization occurs, the temperature conditions varying with the material to be treated, whether rubber, gutta percha or other similar raw material and also on the size of the batch and various other conditions which call for local adjusting.

During the absorption of chlorine, hydrochloric acid is evolved and it is desirable to purge the container of this acid by blowing off from time to time. Otherwise chlorine does not have free access to the material to the back pressure of the hydrochloric acid. It is probable that the hydrochloric acid evolved to some extent combines with the rubber but only to a limited degree hence it is preferably removed at intervals as stated. The rubber may be placed in racks in the chlorination vessel in order to space the sheets properly. The chlorine may enter through a central distributing pipe if desired. The reaction chamber may be made of iron or steel of a strength sufficient to withstand the pressures employed. In order to avoid contamination of the chlor rubber by iron chloride the chamber is preferably lined with lead and the separators likewise may be made of lead, this metal having been found to exert no undesirable action. The presence of iron in the form of the chloride is objectionable if permitted to remain in the chlor rubber and the latter is subjected to heat as such material blackens very quickly when iron is present.

Iodine has been mentioned above as a catalyst and various metallic chlorides may be incorporated with the rubber if desired for catalytic purposes; no catalyst however is necessary. The sunlight or other source of actinic light has an activating effect on chlorination. If the time of exposure of the rubber to chlorine is short and the principal reaction is that of addition but free chlorine also has been adsorbed or dissolved by the rubber, and it has been found on that exposure to sunlight this free chlorine substitutes with the evolution of heat and swelling. This we have noted takes place very rapidly in strong sunlight the masses becoming hot and swelling with a cracking sound on exposure.

It is possible to partially chlorinate the rubber to a moderately brittle substance and then break down into fragments or into a powder which may be subsequently chlorinated to a further degree. Such two-stage method is however not recommended, chlorination in one stage to the product desired being a simpler operation.

With the rubber there may be mixed other substances which are capable of chlorinating to form a co-chlorinated composition. Or solid substances which do not chlorinate may be incorporated with the rubber. The rate of chlorination may be determined in a rough manner by allowing chlorine to enter the chamber until a given pressure is reached and then shutting off the source of chlorine and observing the drop in pressure. When no further drop in pressure occurs after the chamber has been purged several times the chlorination may be considered complete. Such a completely chlorinated product from light colored crêpe rubber is nearly white or slightly cream color, solid vesiculated mass, very soluble in benzol, solvent naphtha, etc. In one case the product obtained contained between 73 and 74 per cent of combined chlorine (calculated for $C_{10}H_{10}Cl_{10}$ 73.1 per cent chlorine).

The following procedures serve to illustrate one manner in which the invention may be carried out.

A quantity of crêpe rubber is placed in an iron vessel lined with lead and chlorine introduced at a pressure of 100 to 125 pounds per square inch above that of the atmosphere. When this pressure is attained the source of supply of the chlorine may be disconnected or on the other hand it may be continued. In case the influx of chlorine is stopped the pressure within the apparatus will be found to fall to approximately 60 pounds per square inch or slightly less. Pressure will not fall materially below this limit even upon several days' standing. At the end of 16 to 24 hours the gases should be vented to eliminate hydrochloric acid and pressure of 100 to 125 pounds applied as before. This is continued the gases being vented from time to time as necessary for a period depending upon the physical condition of the rubber used and the quantity used in the operation. The time varies from approximately 90 hours to 170 hours or more.

The exact procedure employed in one experiment is as follows: 100 grams of crêpe rubber was placed in a lead container 5 inches in diameter which in turn was placed in an apparatus made from 6-inch iron pipe. The rubber was in the form of sheets approximately 5 by 8 inches which were loosely packed in the vessel. The lead vessel had a loosely fitting cap which allowed free access of chlorine. Chlorination was started at the temperature of 18° C. and a chlorine pressure of 80 pounds per square inch above that of the atmosphere. The apparatus was disconnected from the chlorine cylinder when this pressure was reached. After 16 hours the pressure had fallen to 50 pounds per square inch and the temperature was 25° C. Chlorine was then again introduced, the maximum pressure being 128 pounds per square inch. After 24 hours the gases were again vented and a large amount of hydrogen chloride was noticed in the effluent gases. Chlorination was continued at pressures varying from 90 to 105 pounds per square inch, the temperature varying from 23 to 27° C. At the end of the second 24 hours when the gases were vented much hydrogen chloride was again in evidence. Chlorination was continued until a total of 168 hours was reached, the gases being vented every 24 hours, the maximum pressure was 130 pounds per square inch. At the end of this time the vented gases showed much less hydrogen chloride and the apparatus when opened contained a rigid mass of chlorinated rubber which had coalesced so that lines of cleavage between the orginal sheets were scarcely apparent. The weight of the product was 357 grams.

Instead of venting the apparatus at intervals to remove hydrochloric acid the chlorination chamber may be so arranged that a stream of chlorine under pressure passes slowly through it carrying away the hydrochloric acid. On the other hand in some cases especially where low chlorination only is desired the venting or purging of the chlorination chamber may be omitted. For the highly chlorinated product which forms the preferred feature of the present invention that is a rigid coalesced mass of rubber particles in a vesiculated condition containing 60 per cent and upwards of combined chlorine, the venting or purging step specified is highly desirable as a means of accelerating the reaction.

After chlorination the product may be ground and then washed in boiling water or preferably the mass as it comes from the chlorinator is plunged for a time into boiling water. Owing to the presence of dissolved and included gases the mass swells greatly and assumes a very light and porous structure, much of the acid gases being removed in this way thus facilitating grinding. The material may then be ground after which it is further washed. In case the product is contaminated by iron from the grinding machinery which is very deletericus in the drying operation the first wash water may contain a low percentage of hydrochloric acid in order to dissolve this after which the product is repeatedly washed with water, preferably boiling, until the reaction is no longer acid. The product may then be dried at atmospheric pressure at or near 100° C. If iron be present the chlorinated rubber may undergo decomposition at this temperature. The product after washing and drying is a white or very slightly brownish material if no decomposition has occurred.

In chlorinating vulcanized or scrap rubber essentially the same procedure as that described for raw rubber is used. The material is preferably cut into fine shreds and subjected to chlorine pressure preferably of 100 pounds per square inch. The product becomes much lighter in color than the original rubber and is greatly swollen. It is purified from acid in the same manner as described.

Gutta percha owing to its nature can very easily be broken into comparatively small particles or pieces. In this state it takes on chlorine much more rapidly than rubber but the completion of the reaction is evidenced as in the case of rubber by the great swelling and coalescence of the original material. The purification process is the same as described for chlorinated rubber. Chlorinated gutta percha has a higher solubility than chlorinated rubber but is much more brittle.

What we claim is:

1. The process of making chlorinated rubber which comprises reacting with chlorine gas at superatmospheric pressure on a loosely-packed mass composed of pieces of rubber, the mass being freely permeable to chlorine so that this gas may circulate about said pieces and in thus exposing the rubber to the continued action of chlorine to bring about an exothermic reaction and consolidate the pieces into a coherent mass of highly chlorinated rubber.

2. The process of making chlorinated rubber which comprises reacting with chlorine gas at a superatmospheric pressure of at least 60 lbs. on a loosely-packed mass composed of pieces of rubber, the mass being freely permeable to chlorine so that this gas may circulate about said pieces and in thus exposing the rubber to the continued action of chlorine to bring about an exothermic reaction and consolidate the pieces into a coherent mass of highly chlorinated rubber, and maintaining throughout the action, a temperature throughout the mass of below a carbonizing temperature.

3. The process of making chlorinated rubber which comprises reacting with chlorine gas at superatmospheric pressure of 100–125 lbs. on a loosely-packed mass composed of pieces of rubber, the mass being freely permeable to chlorine so that this gas may circulate about said pieces and in thus exposing the rubber to the continued action of chlorine to bring about an exothermic reaction and consolidate the pieces into a coherent mass of highly chlorinated rubber, and in removing hydrochloric acid from time to time during the operation.

4. The process of making chlorinated rubber which comprises reacting with chlorine gas at superatmospheric pressure on a loosely-packed mass composed of pieces of rubber, the mass being freely permeable to chlorine so that this gas may circulate about said pieces and in thus exposing the rubber to the continued action of chlorine to bring about an exothermic reaction and consolidate the pieces into a coherent mass of highly chlorinated rubber, and in removing hydrochloric acid from time to time during the chlorination.

5. The process of making chlorinated rubber, chlorinated gutta percha and the like which comprises exposing the rubber material to the action of compressed chlorine gas at a temperature but slightly above ordinary room temperature, continuing the action of chlorine to secure penetration to the centre of the rubber material and removing hydrochloric acid from time to time.

6. In the process of chlorinating rubber under the pressure the step which comprises venting the chlorination chamber from time to time to remove hydrochloric acid.

7. In the process of chlorinating rubber under pressure the step of removing hydrochloric acid during the progress of chlorination.

8. A rigid coalesced mass of vesiculated pressure chlorinated rubber light in color containing at least 60 per cent of combined chlorine and highly soluble in ordinary rubber solvents.

9. A rigid coalesced, vesiculated chlorinated rubber containing substantially above 67% of combined chlorin.

10. A rigid coalesced, vesiculated chlorinated rubber containing not substantially below 70% of combined chlorin.

11. Chlorinated rubber containing between 73 and 74% of combined chlorin.

CARLETON ELLIS.
NORRIS BOEHMER.